No. 753,503. PATENTED MAR. 1, 1904.
J. M. MARTIN.
DRILL.
APPLICATION FILED SEPT. 13, 1902.
NO MODEL.
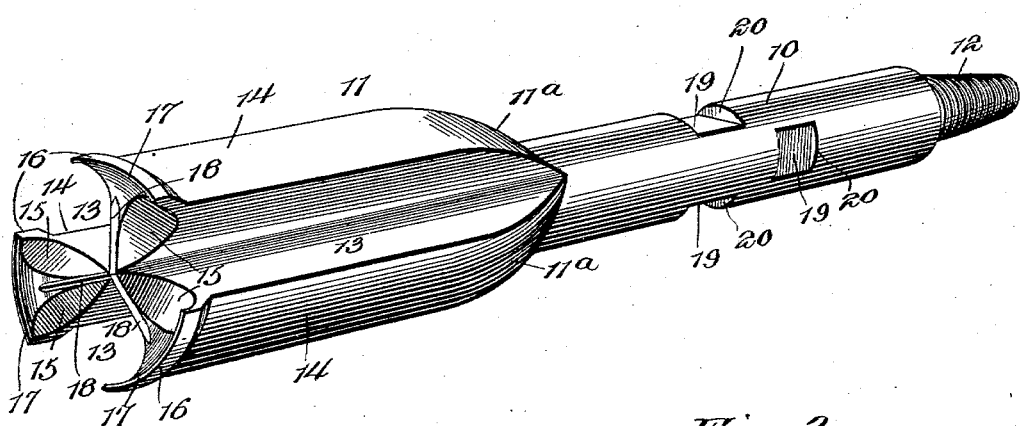
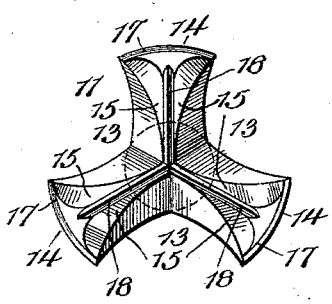 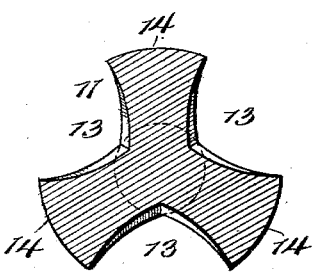
James M. Martin, Inventor, No. 753,503.

Patented March 1, 1904.

UNITED STATES PATENT OFFICE.

JAMES M. MARTIN, OF GUTHRIE, OKLAHOMA TERRITORY, ASSIGNOR OF ONE-HALF TO WILLIAM H. GRIPE, OF GUTHRIE, OKLAHOMA TERRITORY.

DRILL.

SPECIFICATION forming part of Letters Patent No. 753,503, dated March 1, 1904.

Application filed September 13, 1902. Serial No. 123,329. (No model.)

*To all whom it may concern:*

Be it known that I, JAMES M. MARTIN, a citizen of the United States, residing at Guthrie, in the county of Logan and Territory of Oklahoma, have invented a new and useful Drill, of which the following is a specification.

This invention relates to drills, and more particularly to that class employed in boring artesian, oil, and other wells.

The object of the invention is to provide an article of this character which will rapidly cut a straight hole through soil or rock and which requires but slight rotation while in operation.

A further object is to provide a drill which will have more cutting-surface than the ordinary drill and will for this reason operate more expeditiously.

The invention will be readily understood by referring to the accompanying drawings, wherein the preferred embodiment is illustrated.

In said drawings, Figure 1 is a perspective view of the drill. Fig. 2 is an end elevation of the same. Fig. 3 is a cross-sectional view. Fig. 4 is a longitudinal section of a portion of the head of the drill.

Similar numerals of reference indicate corresponding parts in the several figures of the drawings.

In the embodiment shown a shank 10 is employed, having a head 11 at one end and a stem 12 at the other. This stem may be of any well-known or desired form; but, as shown, it is tapered and provided with screw-threads. The head 11 is of greater diameter than the diameter of the shank 10, into which it tapers, as shown at 11ª. The head is provided with a plurality of longitudinal channels 13, which subdivide it into an equal number of longitudinally-disposed webs 14, the outer ends of which are beveled, as illustrated at 15. The webs are provided on their outer end edges with outstanding peripheral flanges 16, and the ends of said flanges are sharpened to provide a plurality of outwardly-curved peripheral cutting edges 17, which are disposed concentrically with the longitudinal axis of the head. The webs, furthermore, have on their ends radially-disposed cutting edges 18, which extend from the center of the head to points contiguous to but spaced a slight distance from the peripheral cutting edges 17, said radial and peripheral edges being located in the same horizontal plane. The shank 10 may be provided on opposite sides with flat transversely-disposed and parallel faces 19, formed by cutting sockets 20 into the shank, these sockets being arranged to receive the jaws of a wrench, as will be readily understood.

In use the drill is attached to the usual mechanism and operated in the ordinary manner. It has been found that because of the combined extent of the cutting edges and their peculiar arrangement not only will the drill do its work rapidly, but that it will not be liable to glance off to one side should it strike a hard rock in one side of the hole being formed. Furthermore, because of the peripheral arrangement of the cutting edges 17 the drill does not have to be continuously operated as those ordinarily employed, and this is a very important advantage. The drill can be made of various sizes and weights and of any material or combinations of materials. It can be applied to any form of stem and will not stick or wedge in the drill-hole. Its advantages are manifold, and tests show that it is a decided improvement over the ordinary Z-bit.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

As an article of manufacture, a drill-head comprising the following parts in combination, a body channeled longitudinally forming a plurality of radial webs, outstanding curved flanges located on the inner ends of the webs, peripheral curved cutting edges formed on the flanges and projecting beyond the ends of the webs, and radial cutting edges projecting from the ends of the webs, said cutting edges being all located in substantially the same plane, the ends of the webs on opposite sides of the radial cutting edges being beveled.

In testimony that I claim the foregoing as my own I have hereto affixed my signature in the presence of two witnesses.

JAMES M. MARTIN.

Witnesses:
M. LUTHER WEST,
W. H. GRIPE.